United States Patent
Garcia-Briz

(10) Patent No.: US 8,144,036 B2
(45) Date of Patent: Mar. 27, 2012

(54) SWITCH SYSTEM

(75) Inventor: Alberto Garcia-Briz, Valls (ES)

(73) Assignee: Lear Corporation, Southfield, MI (US)

( * ) Notice: Subject to any disclaimer, the term of this patent is extended or adjusted under 35 U.S.C. 154(b) by 925 days.

(21) Appl. No.: 11/672,549

(22) Filed: Feb. 8, 2007

(65) Prior Publication Data

US 2008/0191869 A1 Aug. 14, 2008

(51) Int. Cl.
*H03K 17/94* (2006.01)
*H03M 11/00* (2006.01)

(52) U.S. Cl. ............................................. 341/33
(58) Field of Classification Search ............. 200/517
See application file for complete search history.

(56) References Cited

U.S. PATENT DOCUMENTS

| | | | |
|---|---|---|---|
| 4,033,030 A * | 7/1977 | Robinson et al. | 29/622 |
| 4,456,800 A | 6/1984 | Holland | |
| 5,587,567 A * | 12/1996 | Winter et al. | 187/395 |
| 6,088,020 A | 7/2000 | Mor | |
| 7,112,107 B1 | 9/2006 | Torgerud | |
| 7,117,136 B1 | 10/2006 | Rosedale | |
| 7,154,481 B2 | 12/2006 | Cross et al. | |
| 7,435,921 B2 * | 10/2008 | Rae et al. | 200/333 |
| 2004/0114934 A1 | 6/2004 | Taxis | |
| 2005/0259088 A1 | 11/2005 | Ogasawara et al. | |
| 2005/0275567 A1 * | 12/2005 | DePue et al. | 341/32 |
| 2006/0044258 A1 | 3/2006 | Cruz-Hernandez et al. | |
| 2006/0209037 A1 | 9/2006 | Wang et al. | |
| 2006/0217861 A1 | 9/2006 | Ihara et al. | |
| 2006/0259222 A1 | 11/2006 | Farrelly et al. | |

FOREIGN PATENT DOCUMENTS

| | | |
|---|---|---|
| DE | 3802660 A1 | 8/1989 |
| DE | 3838747 A1 | 3/1990 |
| DE | 29909912 U1 | 8/1999 |
| DE | 10142029 C1 | 1/2003 |
| DE | 29522432 U1 | 1/2004 |
| DE | 10252689 A1 | 6/2004 |
| DE | 102004013821 A1 | 10/2005 |
| DE | 102005004335 A1 | 8/2006 |
| DE | 102006013508 A1 | 12/2006 |
| EP | 0703591 A1 | 3/1996 |
| EP | 0851448 A1 | 7/1998 |
| EP | 0852789 A1 | 7/1998 |
| EP | 1187156 A2 | 3/2002 |
| EP | 1643334 A1 | 4/2006 |
| WO | 2006014884 A2 | 2/2006 |

OTHER PUBLICATIONS

German Office Action for corresponding Application No. 10 2008 007 194.3, mailed Mar. 6, 2009, 6 pages.
Summons from German Patent and Trademark Office for corresponding German Application No. 10 2008 007 194.3, mailed Oct. 19, 2009, 2 pages.
Translation of Chinese Office Action for corresponding Application No. 2008100062106, mailed Mar. 11, 2010, 6 pages.

* cited by examiner

*Primary Examiner* — R S Luebke
*Assistant Examiner* — Lheiren Mae Caroc
(74) *Attorney, Agent, or Firm* — Brooks Kushman P.C.

(57) ABSTRACT

The embodiments described herein include a switch system having a frame. The frame may have at least one feedback device is attached thereto. The feedback device provides a discernable feedback upon the receipt of a control signal. Additionally, at least one switch is connected to the frame wherein the switch causes the generation of the control signal when engaged.

20 Claims, 3 Drawing Sheets

SWITCH SYSTEM

TECHNICAL FIELD

The embodiments described herein relate to a switch system.

BACKGROUND

Haptic, audible and/or visual feedback devices have been incorporated into systems such as household appliances, industrial robots and the like. These feedback devices alert users to system settings, constraints, etc. Conventionally, the feedback devices may utilize an actuator to generate or transmit the visual, audible or haptic feedback. In some cases, these actuators are conventionally integrated with switches or switch modules that are operable with the system. As such, the switch systems having the actuators are bulky and pose packaging concerns in many environments.

The embodiments described herein were conceived in view of these and other disadvantages of conventional switching systems adapted to provide feedback.

SUMMARY

The embodiments described herein include a switch system having a frame. In one non-limiting aspect of the invention, at least one feedback device may be attached to the frame, wherein the feedback device provides a discernable feedback upon the receipt of a control signal. Additionally, at least one switch is connected to the frame wherein the switch causes the generation of the control signal when engaged.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE PREFERRED EMBODIMENT(S)

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

The embodiments described herein relate generally to a switch system that provides a discernable feedback including visual, audible and haptic feedback. In one aspect of the invention, the switch system provides feedback when a switch is engaged by a user. As such, the switch system may utilize touch-sensing technologies including, but not limited to, resistive sensing, capacitive sensing, optical imaging sensing, field-effect sensing and the like. Additionally, the embodiments described herein are applicable to virtually any switch system, including vehicular and non-vehicular switch systems.

Figure 1:
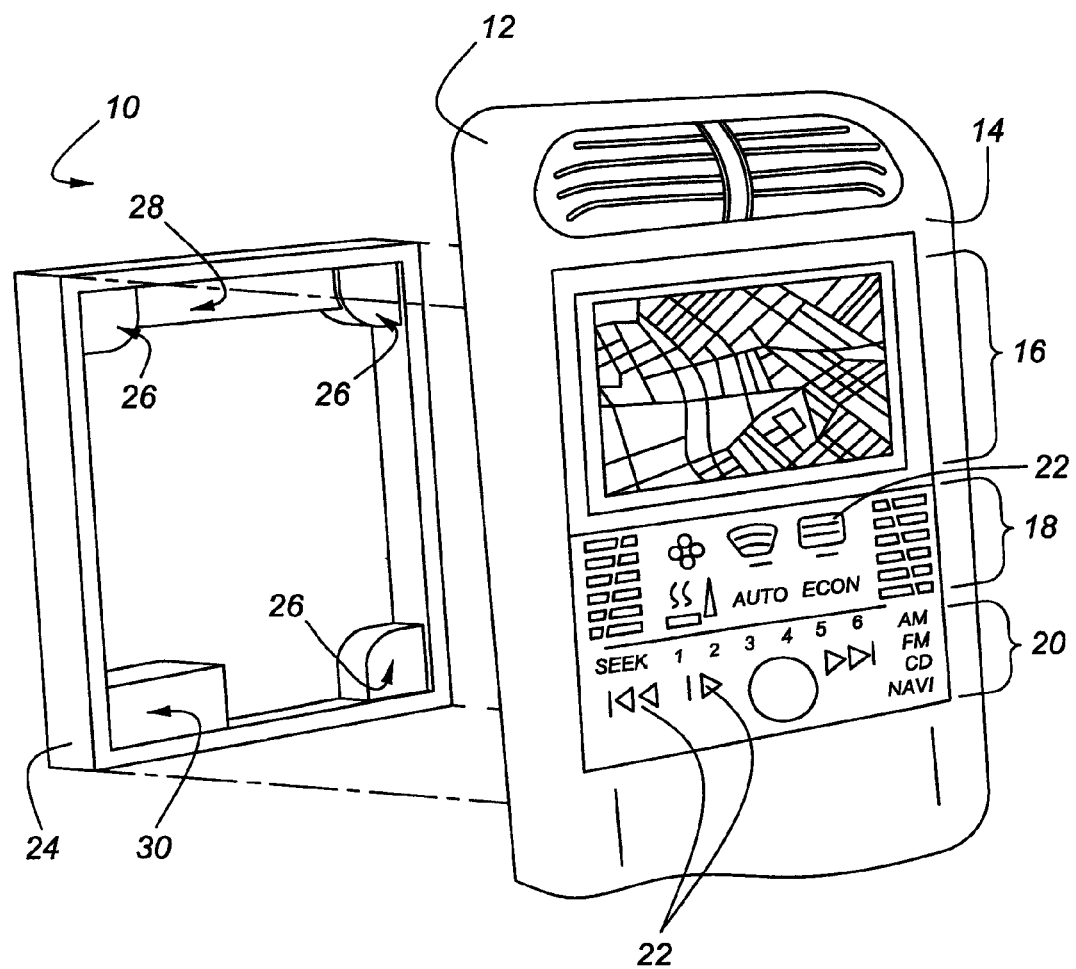
FIG. 1 illustrates a vehicle having a switch system in accordance with an embodiment of the present invention.
Figure 3:
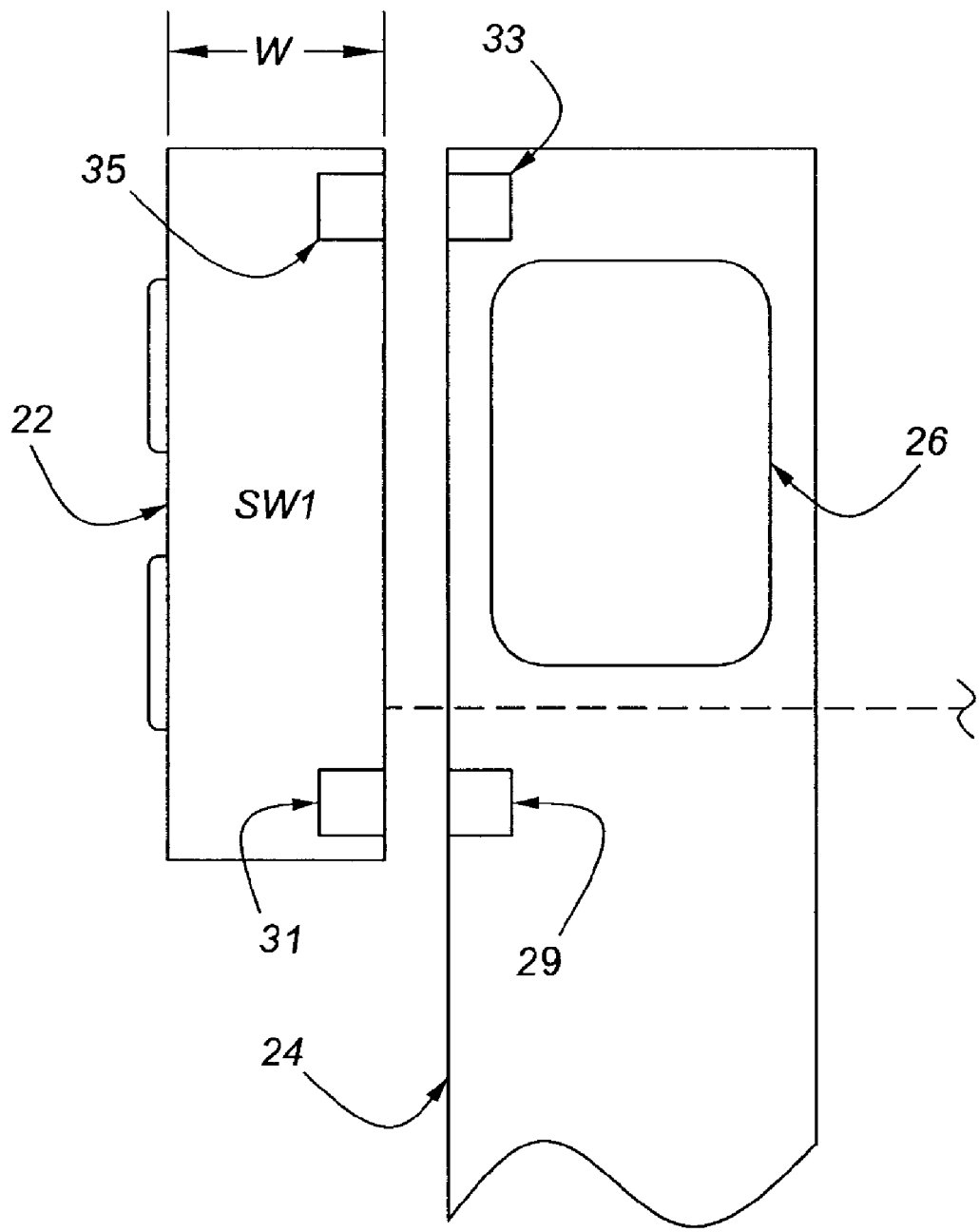
FIG. 3 illustrates an attachment means for the switch system of FIGS. 1, 2A and 2B in accordance with an embodiment of the present invention.

Now, referring to FIG. 1, a vehicle 10 is shown having a switch system in accordance with an embodiment of the present invention. Vehicle 10 has a center console 12 that includes a faceplate 14. Faceplate 14 has a display 16, a control panel 18, and a control panel 20. As recognized by one of ordinary skill in the art, display 16 is adapted to display information for vehicle occupants. In some embodiments, display 16 may be a touch-screen and operate as switches 22. Control panels 18 and 20 include a plurality of switches 22. In one embodiment, switches 22 may be substantially planar switch panels that have a width ("W") of less than 10 mm. (FIG. 3).

As commonly known, switches 22 may be engaged through physical contact by a user. As illustrated, switches 22 may be switches for a heating, ventilation and air conditioning (HVAC) system, an audio system, a navigation system and the like. When switches 22 are engaged, the switch system may provide at least one or any combination of an audible, visual, or haptic response.

Faceplate 14 including display 16, control panel 18, and control panel 20 are attached to a frame 24. Frame 24 may also be fixedly attached to the vehicle 10 in a known manner. Frame 24 may be formed of a rigid plastic or metallic material so as to provide structural support and may have a width of less than 10 mm. Frame 24 also enables design flexibility with respect to faceplate 14. Particularly, frame 24 may enable display 16 and control panels 18 and 20 to be reconfigured in the console 12 without re-designing console 12.

Switches 22 may be attached to frame 24 via a mechanical connection or a magnetic arrangement. In one embodiment, the mechanical connection may include a molded plastic material that is disposed between switches 22 and frame 24. Additionally, switches 22 may be attached to frame 24 via a clip. FIG. 3, illustrates switches 22 being attached to frame 24 through the use of a magnetic arrangement.

As shown, frame 24 includes a magnetic device 29 and a magnetic device 33. Switch 22 also includes a magnetic device 31 and a magnetic device 35. In some embodiments, magnetic devices 29, 31, 33, and 35 are magnets having complementary magnetic characteristics. For example, magnetic device 29 may have a north pole that faces a south pole of magnetic device 31. Accordingly, magnetic device 33 may have a north pole that faces a south pole of magnetic device 35. Thus, switch 22 may be magnetically drawn and securely attached to frame 24 via the magnetic arrangement. The magnetic arrangement also reduces the chance of mismatching or erroneous placement of switch 22 about frame 24.

Referring back to FIG. 1, frame 24 includes a plurality of feedback devices 26, a feedback control 28 and a controller 30. It is recognized that the number and placement of feedback devices 26 may vary upon the particular implementation of the present invention. In most embodiments, feedback devices 26 are positioned in close proximity to switches 22. Feedback devices 26 may be actuators configured to vibrate, emit sound, and the like. Feedback devices 26 may be operable with display 16 so as to provide a discernable feedback (e.g., illuminate display 16) when display 16 is in use. Additionally, controller 30 may be packaged separate and apart from frame 24 in alternative embodiments. Controller 30 may be virtually any data processing device.

Feedback control 28 may include electrical circuitry that is operable with switches 22 so as to enable a switch signal to be transmitted to controller 30 when switches 22 are engaged. In response to the switch signal, controller 30 may generate a control signal for energizing feedback devices 26.

Figure 2A:
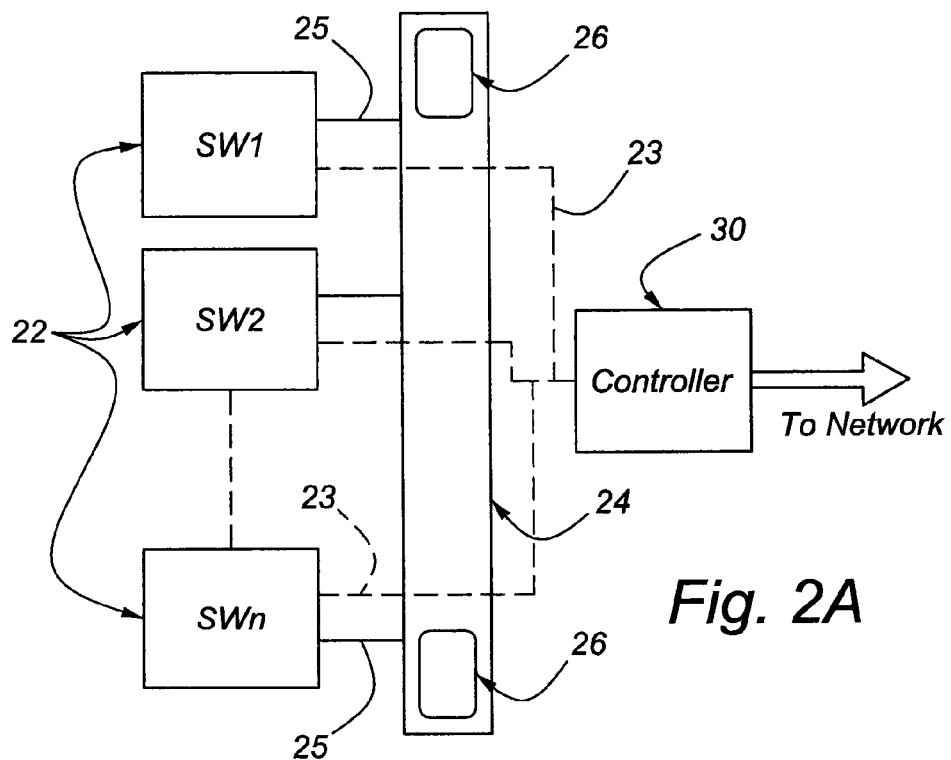
FIGS. 2A and 2B illustrate switch systems in accordance with embodiments of the present invention.
Figure 2B:
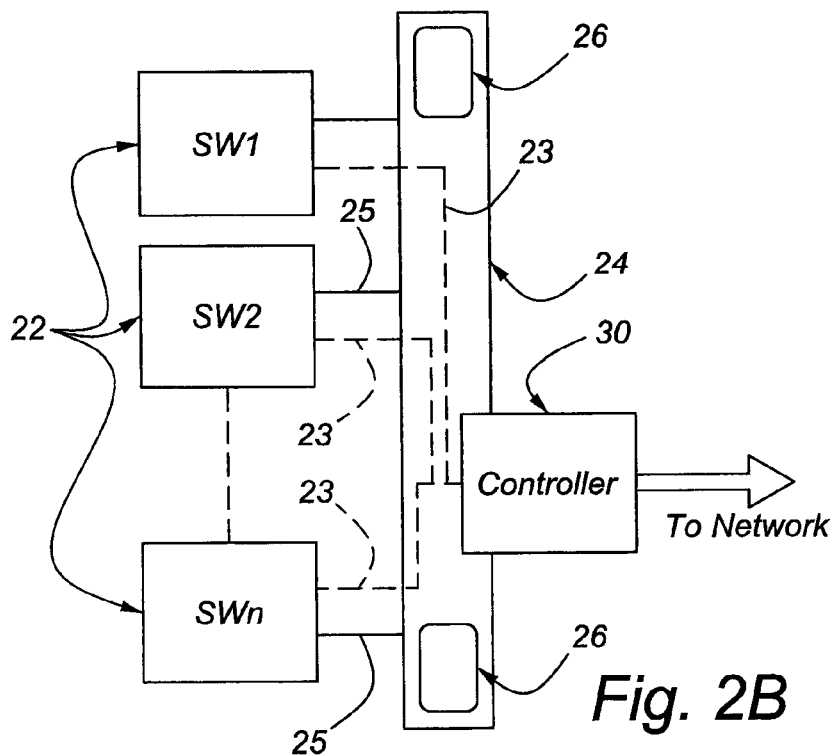

Now, referring to FIGS. 2A and 2B, simplified block diagrams of switch systems are shown in accordance with embodiments of the present invention. FIG. 2A illustrates an embodiment wherein controller 30 is packaged separately from frame 24. Controller 30 in FIG. 2A may be coupled to feedback devices 26 through the use of an electrical connector including, but not limited to, an electrical cable or wire. Alternatively, FIG. 2B illustrates an embodiment wherein controller 30 is integrated with frame 24. In FIG. 2B, controller 30 may be coupled to frame 24 via a mechanical plug or male/female connection. Conventional switch systems adapted to provide feedback have the actuators packaged with the switch. However, as shown in Figures, the feedback devices 26 are not integrated with switches 22. Unlike conventional systems, feedback devices 26 are physically attached to frame 24 as opposed to the switches 22.

As described above, switches 22 may be attached to frame 24 through the use of a mechanical connection 25 including, but not limited to, a clip. When a user engages switches 22, the switch signals are transmitted across communications link 23 to controller 30. Upon receipt of the switch signal, controller 30 generates a control signal for the feedback devices 26. In response, feedback devices provide the discernable feedback. As shown, controller 30 may be coupled to a network (e.g., a vehicle network) and transmit corresponding control signals across the network to other devices.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle switch system comprising:
   a rigid frame for positioning in a vehicle, the frame including:
      a controller positioned thereon for transmitting a control signal in response to a switch signal; and
      at least one feedback device positioned thereon for providing a discernable feedback in the vehicle in response to the control signal; and
   a vehicle center console having a front and a rear side, the rear side of the vehicle center console being coupled to the frame such that the frame supports the vehicle center console to the front of the vehicle, the vehicle center console including:
      at least one switch for generating the switch signal.

2. The system of claim 1, wherein the switch includes a substantially planar switch panel.

3. The system of claim 2, wherein the switch has a width of less than 10 millimeters.

4. The system of claim 1, wherein the switch is connected to the frame through the use of a magnetic arrangement when the rear side of the console is coupled to the frame.

5. The system of claim 1, wherein
   the controller is configured to process the at least one switch signal and to generate the control signal for the feedback device.

6. The system of claim 1, wherein the controller is attached to the frame.

7. The system of claim 5, wherein the controller is coupled to a network, the controller transmitting a network signal corresponding to the control signals across the network.

8. The system of claim 1, wherein the discernable feedback includes at least one of an audible feedback, a visual feedback, and a haptic feedback.

9. The system of claim 1, wherein the frame is formed of a plastic or metallic material.

10. A vehicle switch system comprising:
    a frame assembly including a frame and a feedback device positioned thereon, the frame being formed of a rigid material and for positioning on a vehicle and behind a vehicle center console such that the frame is not visible to a vehicle occupant, the vehicle center console having at least a portion for display to the vehicle occupant, the frame for supporting the vehicle center console on the vehicle and the feedback device being arranged to provide a discernable feedback including an audible signal in the vehicle upon receipt of a control signal; and
    the vehicle center console including:
       first and second switch panels being disposed in close proximity to the feedback device and being arranged to cause the control signal to be generated when engaged, the first and second switch panels each being substantially planar.

11. The system of claim 10, wherein the feedback device includes an actuator for generating the audible signal.

12. The system of claim 10, further comprising a controller being integrated within the frame for receiving a first switch signal from the first switch panel and a second switch signal from the second switch panel.

13. The system of claim 10, wherein the first and second switch panels are attached to the frame through the use of a magnetic arrangement.

14. The system of claim 10, further comprising a controller being in communication with the feedback device and the first and second switch panels, the controller for processing switch signals generated by the first and second switch panels when engaged and for generating the control signal for the feedback device in response to the switch signals.

15. The system of claim 14, wherein the controller is integrated within the frame.

16. The system of claim 14, wherein the controller is configured to transmit network signals corresponding to the control signals across a network.

17. The system of claim 10, wherein the discernable feedback further includes at least one a visual feedback and a haptic feedback.

18. A switch system for a vehicle comprising:
    a frame for positioning to the vehicle, the frame being formed of a rigid material and for positioning behind a vehicle center console such that the frame is not visible to a vehicle occupant, the vehicle center console having at least a portion for display to the vehicle occupant, the frame for supporting the vehicle center console on the vehicle;
    at least one feedback device being positioned on the frame, the feedback device for providing an audible feedback in the vehicle upon receipt of a control signal;
    at least one switch for positioning on the vehicle center console, the switch for causing the generation of a switch signal when engaged; and
    a controller for receiving the switch signal and for generating the control signal in response to the switch signal.

19. The system of claim 18, wherein the discernable feedback further includes at least one of a visual feedback and a haptic feedback.

20. The system of claim 18, the controller is integrated within the frame.

* * * * *